United States Patent [19]
Antkowiak et al.

[11] Patent Number: 5,153,159
[45] Date of Patent: Oct. 6, 1992

[54] ELASTOMERS AND PRODUCTS HAVING REDUCED HYSTERESIS

[75] Inventors: Thomas A. Antkowiak, Rittman; David F. Lawson, Uniontown; Russell W. Koch, Hartville; Mark L. Stayer, Jr., Mogadore, all of Ohio

[73] Assignee: Bridgestone/Firestone, Inc., Akron, Ohio

[21] Appl. No.: 506,305

[22] Filed: Apr. 9, 1990

[51] Int. Cl.$^5$ .................................................. C08F 4/48
[52] U.S. Cl. ................................... 502/155; 502/157; 526/180
[58] Field of Search ................. 525/250; 502/155, 157

[56] References Cited

U.S. PATENT DOCUMENTS

| | | | |
|---|---|---|---|
| 3,177,190 | 4/1965 | Hsieh | 260/94.2 |
| 3,317,918 | 5/1967 | Foster | 260/83.7 |
| 3,393,182 | 7/1968 | Trepka | 260/79.5 |
| 3,426,006 | 2/1969 | Nützel et al. | 260/83.5 |
| 3,439,049 | 4/1969 | Trepka | 260/624 |
| 3,856,877 | 12/1974 | Otsuki et al. | 260/677 |
| 4,015,061 | 3/1977 | Schulz et al. | 526/178 |
| 4,026,865 | 5/1977 | Uraneck et al. | 260/42.32 |
| 4,085,265 | 4/1978 | Otsuki et al. | 526/49 |
| 4,247,418 | 1/1981 | Halksa et al. | 502/157 X |
| 4,414,372 | 11/1983 | Farnham et al. | 526/190 |
| 4,429,091 | 1/1984 | Hall | 526/181 |
| 4,476,240 | 10/1984 | Hall et al. | 502/155 |
| 4,478,953 | 10/1984 | Yuki et al. | 502/155 |
| 4,614,771 | 9/1986 | Watanabe et al. | 525/351 |
| 4,616,069 | 10/1986 | Watanabe et al. | 525/370 |
| 4,736,003 | 4/1988 | Schneider et al. | 526/190 |
| 4,894,409 | 1/1990 | Shimada et al. | 524/492 |
| 4,914,147 | 4/1990 | Mouri et al. | 524/495 |

FOREIGN PATENT DOCUMENTS

| | | |
|---|---|---|
| 0067111 | 5/1982 | European Pat. Off. . |
| 0264506 | 10/1986 | European Pat. Off. . |
| 0282437 | 3/1988 | European Pat. Off. . |
| 0290883 | 4/1988 | European Pat. Off. . |
| 0316255 | 10/1988 | European Pat. Off. . |
| 138070 | 10/1979 | Fed. Rep. of Germany . |
| 0247455 | 8/1987 | Fed. Rep. of Germany . |
| 2117778 | 3/1983 | United Kingdom . |

OTHER PUBLICATIONS

"Polymerization of Unsaturated Compounds in the Presence of Lithium Diethylamide" by Vinogradov et al, Polymer Science USSR, vol. 4, 1963.
Chemical Abstracts, vol. 91, No. 12, Sep. 1979, Chiba et al.
"Preparation of Some Trialkyltin-lithium Compounds" by Gillman et al, J. Am. Chem. Soc., 75, 2507-2508 (1953).
"Preparation and Reactions of Trialkyltinlithium" by Tamborski et al, J. Org. Chem. 28, 237-239 (1963).
"Some Rreactions of Tributyl-and Triphenyl-stannyl Derivatives of Alkali Metals" by Blake et al, J. Chem. Soc., 1961, 618-622.
"Studies of the Anionic Polymerization of Phenyl Vinyl Sulfoxide and Its Copolymer with Styrene" by Kanaga et al, Macromolecules, 1990, 23, 4235-4240.
"Thermal Elimination of Poly(phenyl vinyl sulfoxide) and Its Polystyrene Block Copolymers" by Kanga et al, Macromolecules, 1990, 23, 4241-4246.
"An Improved Synthesis of p-dimethylaminophenyl-lithium" by Hallas et al, Chemistry and Industry, May 10, 1969, 620.
"Anionic Polymerization Initiated by Diethylamide in Organic Solvents" by Angood et al, Journal of Polymer Science, vol. 11, pp. 2777-2791 (1973).
"Anionic Polymerization" by Cheng, Americal Chemical Society Symposium Series 166, pp. 513-528 (1981).
"New perfectly difunctional organolithium initiators for block copolymer systhesis: Synthesis of dilithium initiators in the absence of polar additives" Polymer, vol. 22, Dec., 1981, p. 1724, by Guyot et al.
"A Bifunctional Anionic Initiator Soluble in Non-polar Solvents" Makromol. Chem., 179, 1978, pp. 551-555, by Beinert et al.
"Bifunctional anionic initiators: A critical study and overview" Makromol. Chem., 186, 1985, pp. 2017-2024, by Bandermann et al.
"Anionic Polymerization Initiators Containing Protected Functional Groups" Journal of Polymer Science, vol. 15, 1977, pp. 2401-2410, by Schulz et al.
"Specific Functionalization of Polymers by Carboxyl Groups" Makromol. Chem., 179, 1978, pp. 1383-1386, by Broze et al.
"3-Dimethylaminopropyl-Lithium-An Analytical and Kinetic Investigation of a New Initiator System for Polymer Synthesis" European Polyme Journal, vol. 11, 1975, pp. 699-704, by Eisenbach et al.
"Anionic Polymerization Initiators Containing Protected Functional Groups and functionally Terminated Diene Polymers" Journal of Polymer Science, Polymer Chemistry Edition, vol. 12, 1974, pp. 153-166, by Schulz et al.

Primary Examiner—Patrick P. Garvin
Attorney, Agent, or Firm—Daniel N. Hall

[57] ABSTRACT

An anionic polymerization initiator comprising the reaction product of a functionalizing agent selected from the group consisting of substituted aldimines, ketimines and secondary amines and, an organolithium compound. Elastomeric polymers prepared with these initiators have functional sites incorporated at the initiator end of the polymer chain and provide vulcanizable rubber compounds exhibiting reduced hysteresis. Articles such as tires, produced with low hysteresis elastomeric polymers have lower rolling resistance. Methods are also provided for preparing the initiators, fuctionalized polymers and vulcanizable elastomeric compounds having reduced hysteresis.

5 Claims, No Drawings

ELASTOMERS AND PRODUCTS HAVING REDUCED HYSTERESIS

TECHNICAL FIELD

The subject invention relates to the anionic polymerization of diene polymer and copolymer elastomers. More specifically, the present invention relates to anionic polymerization employing an initiator formed by the reaction of a functionalizing agent and an organolithium compound.

Diene polymers and copolymers prepared according to the present invention, have reduced hysteresis characteristics. Articles such as tires, power belts and the like which are prepared from these polymers exhibit increased rebound, decreased rolling resistance and less heat build-up during mechanical stress operation.

BACKGROUND ART

In the art it is desirable to produce elastomeric compounds exhibiting reduced hysteresis. Such elastomers, when compounded to form articles such as tires, power belts and the like, will show an increase in rebound, a decreased rolling resistance and will have less heat build-up when mechanical stresses are applied.

Previous attempts at preparing reduced hysteresis products have included high temperature mixing of the filler-rubber mixtures in the presence of selectively-reactive promoters to promote compounding material reinforcement; surface oxidation of the compounding materials; chemical modifications to the terminal end of polymers using tetramethyldiaminobenzophenone (Michler's ketone), tin coupling agents and the like and, surface grafting thereon. All of these approaches have focused upon increased interaction between the elastomer and the compounding materials.

It has also been recognized that carbon black, employed as a reinforcing filler in rubber compounds, should be well dispersed throughout the rubber in order to improve various physical properties. One example of the recognition is provided in published European Pat. Appln. EP 0 316 255 A2 which discloses a process for end capping polydienes by reacting a metal terminated polydiene with a capping agent such as a halogenated nitrile, a heterocyclic aromatic nitrogen containing compound or an alkyl benzoate. Additionally, the application discloses that both ends of the polydiene chains can be capped with polar groups by utilizing functionalized initiators, such as lithium amides.

The present invention provides novel initiators for anionic polymerization which become incorporated into the polymer chain providing a functional group which greatly improves the dispersability of carbon black throughout the elastomeric composition during compounding. As will be described hereinbelow, these initiators are a product of the reaction between certain types of nitrogen-containing organic compounds and organolithium compounds.

Organolithium polymerization initiators are also known in the art. U.S. Pat. No. 3,439,049, owned by the Assignee of record, discloses an organolithium initiator prepared from a halophenol in a hydrocarbon medium.

U.S. Pat. No. 4,015,061 is directed toward amino-functional initiators which polymerize diene monomers to form mono- or di-primary aryl amine-terminated diene polymers upon acid hydrolysis.

DISCLOSURE OF THE INVENTION

It is therefore an object of the present invention to provide anionic polymerization initiators which promote the incorporation of functional, active groups in the polymer chain.

It is another object of the present invention to provide a method of preparing an anionic polymerization initiator.

It is another object of the present invention to provide functionalized polymers having active terminal groups.

It is another object of the present invention to provide a method for preparing functionalized polymers having active terminal groups.

It is another object of the present invention to provide vulcanizable elastomeric compounds having reduced hysteresis.

Still another object of the present invention is to provide a method for the preparation of vulcanizable elastomeric compounds having reduced hysteresis.

It is still another object of the present invention to provide an improved pneumatic tire having decreased rolling resistance.

These and other objects together with the advantages thereof over the existing art, which shall become apparent from the specification which follows, are accomplished by the invention as hereinafter described and claimed.

In general, the present invention provides an anionic polymerization initiator comprising the reaction product of a functionalizing agent selected from the group consisting of substituted aldimines, ketimines and secondary amines; and, an organolithium compound.

A method of preparing an anionic polymerization initiator is also provided which comprises the steps of reacting a functionalizing agent selected from the group consisting of substituted aldimines, ketimines and secondary amines; and an organolithium compound.

The present invention also provides functionalized polymers comprising a polymer chain carrying the functional group X at the initiator end, wherein X is derived from the reaction product of a functionalizing agent selected from the group consisting of substituted aldimines, ketimines and secondary amines; and, an organolithium compound, and the lithium atom from the organolithium compound is carried at the other end of the polymer chain prior to quenching.

A method of preparing functionalized polymers is also provided which comprises the steps of forming a solution of one or more anionically polymerizable monomers in a solvent and, initiating the polymerization of the monomers with an initiator comprising the reaction product of a functionalizing agent selected from the group consisting of substituted aldimines, ketimines and secondary amines; and an organolithium compound, wherein a functional group derived from the reaction product is incorporated onto the polymer chain at the initiator end and the lithium atom from the organolithium compound is carried at the other end of the polymer prior to quenching.

A vulcanizable elastomeric compound having reduced hysteresis properties is also provided comprising an elastomeric polymer having chains carrying the functional group X at the initiator end, wherein X is the reaction product of a functionalizing agent selected from the group consisting of substituted aldimines, ketimines and secondary amines; and an organolithium compound, wherein the lithium atom from the organolithium compound is carried at the other end of the polymer chain prior to quenching. The compound additionally comprises from about 5 to 80 parts by weight of carbon black, per 100 parts of the polymer.

A method for preparing vulcanizable elastomeric compounds having reduced hysteresis properties is also provided which comprises the steps of polymerizing one or more anionically polymerizable monomers in the presence of an initiator comprising the reaction product of a functionalizing agent selected from the group consisting of substituted aldimines, ketimines and secondary amines; and an organolithium compound to form an elastomer, wherein a functional group derived from the reaction product is incorporated onto the polymer chain at the initiator end and the lithium atom from the organolithium compound is carried at the other end of the polymer prior to quenching; and adding from about 5 to 80 parts by weight of carbon black, per 100 parts of the elastomer to form a blend of the vulcanizable elastomeric composition.

An improved tire having decreased rolling resistance resulting from a tread stock containing a vulcanizable elastomeric composition is also provided and comprises an elastomeric polymer having chains carrying the functional group X at the initiator end, wherein X is the reaction product of a functionalizing agent selected from the group consisting of substituted aldimines, ketimines and secondary amines; and an organolithium compound, wherein the lithium atom from the organolithium compound is carried at the other end of the polymer chain prior to quenching; and from about 5 to 80 parts by weight of carbon black, per 100 parts of the polymer.

PREFERRED MODE FOR CARRYING OUT THE INVENTION

As will become apparent from the description which follows, the present invention provides a novel initiator for anionic polymerization of diene homopolymer and copolymer elastomers. Polymers prepared with these initiators contain a functional terminal group and it has been discovered herein that vulcanizable elastomeric compounds and articles thereof based upon such functionally terminated polymers exhibit useful properties, particularly reduced hysteresis. Hysteresis is generally known as the failure of a property that has been changed by an external agent to return to its original value when the cause of the change is removed. When compounded to make products such as tires, power belts and the like, these polymeric products exhibit increased rebound, decreased rolling resistance and less heat build-up during periods of applied mechanical stress.

The initiators, according to the present invention, are the reaction product of an organolithium compound and a functionalizing agent selected from the group consisting of substituted aldimines, substituted ketimines and substituted secondary amines. The organolithium compound has the general formula RLi where R is selected from the group consisting of alkyls, cycloalkyls, alkenyls, alkynyls, aryls and aralkyls having from 1 to about 20 carbon atoms and short chain length low molecular weight polymers from diolefin and vinyl aryl monomers having up to about 25 units. Typical alkyls include n-butyl, s-butyl, methyl, ethyl, isopropyl and the like. The cycloalkyls include cyclohexyl, menthyl and the like. The alkenyls include allyl, vinyl and the like. The aryl and aralkyl groups include phenyl, benzyl, oligo(styryl) and the like. Exemplary short chain length polymers include the oligo(butadienyls), oligo(isoprenyls), oligo(styryls) and the like.

The substituted imine or "Schiff base" is known in the art as being a compound nominally derived from the condensation reaction of an aldehyde or ketone with a primary amine. For the purpose of this invention, the substituted aldimine has the general formula

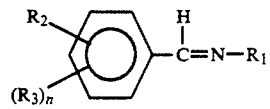

where $R_1$ is selected from the group consisting of alkyls and aralkyls having from 1 to about 20 carbon atoms, with the proviso that the carbon atom adjacent the nitrogen atom contains at least one hydrogen; and $R_2$ is selected from the group consisting of dialkyl and dicycloalkyl aminos having the formula

and cyclic amines having the formula

where $R_4$ is an alkyl, cycloalkyl or aralkyl group having from 1 to about 12 carbon atoms, where both $R_4$ groups may be the same or different, and $R_5$ contains from 3 to about 6 methylene groups. $R_3$ can be an alkyl group having from 1 to about 12 carbon atoms and n is an integer from 0 to 4.

Exemplary $R_1$ groups include methyl, ethyl, butyl, octyl, 3-phenyl-1-propyl and the like. Exemplary $R_2$ groups, where $R_4$ is methyl, ethyl or cyclohexyl for instance, include dimethyl amino, diethyl amino and dicyclohexyl amino, respectively. Exemplary $R_2$ groups are piperidinyl where $R_5$ is $(CH_2)_5$ and pyrrolidinyl where $R_5$ is $(CH_2)_4$. Exemplary $R_3$ groups include methyl, ethyl, propyl and the like.

The substituted ketimines formed by the reaction of a ketone with a primary amine that can be reacted with the organolithium compound have the formula

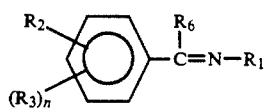

where $R_1$ and $R_2$ are as described hereinabove and $R_6$ is selected from the group consisting of alkyls, aryls, cycloalkyls, alkenyls and aralkyls having from 1 to about 20 carbon atoms and short chain length low molecular weight polymers from diolefin and vinyl aryl monomers having up to about 25 units. Exemplary alkyls include methyl, ethyl, isopropyl, n-hexyl and the like. Exemplary cycloalkyls include cyclohexyl and cyclopentyl and the like. Exemplary vinyl aryls include phenyl and dimethylamino phenyl and the like. Exemplary aralkyls include 3-phenyl-1-propyl and the like. Exemplary alkenyls include 3-butenyl and 5-hexenyl and the like.

The substituted secondary amines that can be reacted with the organolithium compound have the general formula

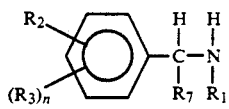

where $R_1$, $R_2$ and $R_3$ are as described hereinabove and $R_7$ is H or R.

Of the foregoing functionalizing agents disclosed, the substituted aldimines are preferred. Examples of such substituted aldimines useful in the present invention include dimethylaminobenzylidenemethylamine, or (DMa)BMA,

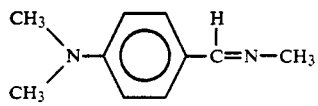

diethylaminobenzylidenemethylamine,

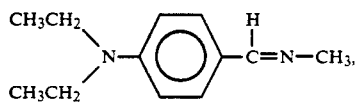

piperidinylbenzylidenemethylamine,

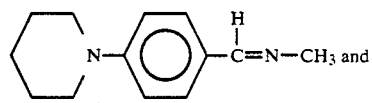

dimethylaminobenzylidenebutylamine,

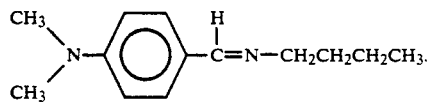

The initiator according to the present invention can be prepared by preparing a solution of the substituted aldimine Schiff base, substituted ketimine or substituted secondary amine in an anhydrous, aprotic solvent, such as hexane. To this solution is then added the organolithium catalyst (RLi) in the same or a similar solvent. Both are allowed to react for approximately one hour at ambient temperature (25° to 30° C.), following which the catalyst is ready for use. It is not necessary to remove the solvent inasmuch as the anionic polymerization is conducted in the same solvent. Amounts of the two reactants range from about 0.8 to 1.2 mmoles of Schiff base to 1.0 mmole of organolithium catalyst, with equimolar parts being preferred. It is to be appreciated by one skilled in the art that various reaction temperatures and times may be useful and are within the scope of the present invention.

As stated above, the initiator thus formed may be employed as an initiator to prepare any anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers, A and copolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms. Preferred elastomers include diene homopolymers such as polybutadiene and polyisoprene and copolymers such as styrene butadiene rubber (SBR). Copolymers can comprise from about 99 to 20 percent by weight of diene units and from about 1 to 80 percent by weight of monovinyl aromatic or triene units, totalling 100 percent. The polymers and copolymers of the present invention may have 1,2-microstructure contents ranging from about 10 to about 80 percent, with the preferred polymers or copolymers having 1,2-microstructure contents of from about 25 to 65 percent, based upon the diene content.

The copolymers are preferably random copolymers which result from simultaneous copolymerization of the monomers forming the A and B polymers, as is known in the art. The block copolymers (poly (b-B-b-A-b-B), result from the separate polymerization of the monomers forming the A and B polymers as is known in the art. Such block copolymers which include poly(styrene-butadienestyrene) are thermoplastic elastomers.

The initiators of the present invention form "living polymers" from the foregoing monomers, the general formula of which is

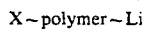

where the polymer is any of the foregoing diene homopolymers, monovinyl aromatic homopolymers, diene/-monovinyl aromatic random copolymers and block copolymers and X is the group resulting from the reaction product of the substituted imine, secondary amine or ketimine and the organolithium initiator. The lithium proceeds to move down the growing chain as polymerization continues. As an example where the substituted imine is (DMa)BMA, and RLi is n-butyl lithium, X is

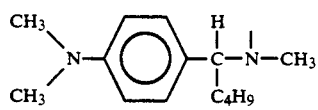

and the polymer chain extends from the methylamine nitrogen. It should be apparent that the lithium atom from the reaction product X is carried by the other end of the polymer chain as depicted hereinabove, until the reaction is quenched.

Polymerization is usually conducted in a conventional solvent for anionic polymerizations such as hexane, cyclohexane, benzene and the like. Other techniques for polymerization, such as semi-batch and continuous polymerization may be employed. In order to promote randomization in copolymerization and to increase vinyl content, a modifier may optionally be added to the polymerization ingredients. Amounts range between 0 to 90 or more equivalents per equivalent of lithium. The amount depends upon the amount of vinyl desired, the level of styrene employed and the temperature of the polymerizations, as well as the Schiff base selected to form the initiator.

Compounds useful as modifiers are organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); tetrahydrofuran (THF), THF oligomers linear and cyclic oligomeric oxolanyl alkanes and the like. The linear oligomeric oxolanyl modifiers are represented by the structural formulae

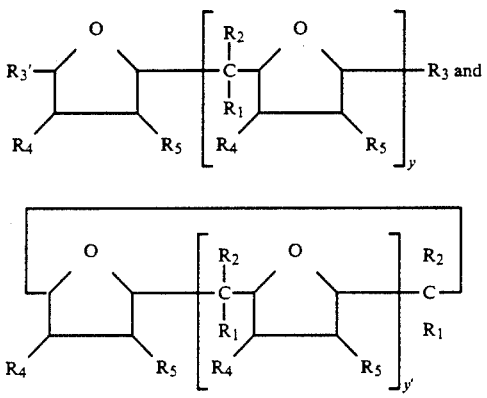

wherein $R_1$ and $R_2$ independently are hydrogen or an alkyl group and the total number of carbon atoms in $-CR_1R_2-$ ranges between one and nine inclusive; y is an integer of 1 to 5 inclusive; y' is an integer of 3 to 5 inclusive; and $R_3'$, $R_3$, $R_4$, and $R_5$ independently are $-H$ or $-C_nH_{2n+1}$ wherein $n=1$ to 6.

The modifiers of the first formula are linear oligomers and the modifiers represented by the second structural formula are cyclic oligomers and further details thereof can be found in U.S. Pat. No. 4,429,091, owned by the Assignee of record, the subject matter of which is incorporated herein by reference.

Polymerization is begun by charging a blend of the monomer(s) and solvent to a suitable reaction vessel, followed by the addition of the modifier and the initiator solution previously described. The procedure is carried out under anhydrous, anaerobic conditions. The reactants are heated to a temperature of from about 30° to 120° C. and are agitated for about 0.15 to 24 hours. After polymerization is complete, the product is removed from the heat and terminated in one or more ways.

For example, a protic quenching agent may be employed to give a monofunctional polymer chain. Quenching may be conducted in water, steam or an alcohol such as isopropanol, or any other suitable method.

Alternatively, the polymer may be terminated with another reactive molecule to form a difunctional polymer. An example would be to quench with the Schiff base dimethylaminobenzylidenemethylamine. Other examples would include tin tetrachloride; Michler's ketone; 1,3-dimethyl-2-imidazolidinone; 1-alkyl substituted pyrrolidones, e.g., methyl, 1-methyl-2-pyrrolidone, ethyl, propyl, butyl and the like; 1-aryl substituted pyrrolidones, e.g., phenyl, and the like; other Schiff bases and the like.

Further examples of reactive molecules include the terminators described in our copending application now U.S. Pat. No. 5,066,729, the subject matter of which is incorporated by reference herein. It is to be understood that practice of the present invention is not limited solely to these terminators inasmuch as other compounds that are reactive with the polymer bound carbon-lithium moiety can be selected to provide a desired functional group.

Quenching is usually conducted by tumbling the polymer and quenching agent for about 0.05 to about 2 hours at temperatures of from about 30° to 120° C. to insure complete reaction. Polymers terminated with a functional agent such as a Schiff base and the like, are subsequently quenched with alcohol or other quenching agent as described hereinabove.

Lastly, the solvent is removed from the polymer by drum drying, extruder drying, vacuum drying or the like, which may be combined with coagulation with water, alcohol or steam. If coagulation with water or steam is used, oven drying may be desirable.

The polymers of the present invention contain a functional group at the head of the polymer chain rather than at the terminal end of the chain. These functional groups have an affinity for compounding materials such as carbon black. Such compounding results in products exhibiting reduced hysteresis, which means a product having increased rebound, decreased rolling resistance and has lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires.

The polymers of the present invention can be utilized as 100 parts of the rubber in the treadstock compound or, they can be blended with any conventionally employed treadstock rubber which includes natural rubber, synthetic rubber and blends thereof. When the polymers of the present invention are blended with conventional rubbers, the amounts can vary widely with a lower limit comprising about 10 to 20 percent by weight of the total rubber. It is to be appreciated that the minimum amount will depend primarily upon the degree of reduced hysteresis that is desired.

The polymers can be compounded with all forms of carbon black in amounts ranging from about 5 to 80 parts by weight, per 100 parts of rubber (phr), with about 35 to 60 phr being preferred. The reinforced rubber compounds can be cured in a conventional manner with known vulcanizing agents at about 0.1 to 10 phr. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents can be used alone or in combination.

Vulcanizable elastomeric compositions of the invention can be prepared by compounding or mixing the functionalized polymers herein with carbon black and other conventional rubber additives such as fillers, plasticizers, antioxidants, curing agents and the like using standard rubber mixing equipment and procedures. Such elastomeric compositions when vulcanized using conventional rubber vulcanization conditions have reduced hysteresis properties and are particularly adapted for use as tread rubbers for tires having reduced rolling resistance.

GENERAL EXPERIMENTAL

In order to demonstrate the preparation and properties of elastomers prepared according to the present invention, a functional initiator was prepared by treating dimethylaminobenzylidenemethylamine with n-butyl lithium at 25° C. under an inert atmosphere. The initiator was then used to prepare a styrenebutadiene elastomer in solution and under an inert atmosphere, using a modifier to randomize the monomers. The termination reaction involved quenching with either isopropanol or with a second equivalent of dimethylaminobenzylidenemethylamine and then isopropanol. As noted above, various techniques known in the art for carrying out polymerizations may be used with these initiators without departing from the scope of the present invention.

INITIATOR PREPARATION

Into a baked-dry, nitrogen purged bottle was syringed a solution comprising 10.0 mmoles of the Schiff base (DMa)BMA or benzylidenemethylamine (BMA) in dry hexane. To this solution was added 10.0 mmoles of n-butyl lithium/hexane solution. The components were allowed to react at 25° C. for one hour.

POLYMERIZATION

A dry blend of 1,3-butadiene-styrene/hexane was charged to glass, baked-dry, nitrogen purged bottles, capped with rubber liners. Parts of each component were varied among examples, details of which appear in the tables which follow. Next was added a modifier and the initiator followed by immediate stirring while maintaining the temperature between 50° and 80° C. for about 1 to 8 hours. Initiation was conducted with n-butyl lithium, as a control, with initiators of the present invention.

After polymerization was complete, the reactions were quenched with isopropyl alcohol or an additional Schiff base of the present invention to provide, in the latter instance, a difunctional polymer chain. Quenching was actually conducted by adding the desired agent and then agitating the cement. Thereafter, the polymer was desolventized by coagulation in isopropyl alcohol, followed by drum-drying at 150° C. before subsequent compounding and testing of cured physical properties.

In the examples which follow, 10 SBR copolymers were prepared by polymerizing butadiene (Bd) with styrene (Sty) in the presence of hexane according to the foregoing procedures. Amounts of the monomers, solvent and initiator are presented in Tables I–IV. An oligomeric oxolanyl alkane modifier, as described in the aforementioned U.S. Pat. No. 4,429,091, was added to randomize the styrene distribution. The modifier was also helpful to raise the vinyl content of the polymer formed. The amount of modifier that was employed and the temperature of the polymerization for each of the examples are presented in Tables I to IV.

Examples 1–4 were polymerized at 50° C. for 5.5 to 6.2 hours as reported in Tables I and II. Example 1 was initiated with n-butyl lithium and quenched with the Schiff's base (DMa)BMA. Example 2 was initiated with the reaction product of the Schiff's base BMA and n-butyl lithium, and quenched with isopropyl alcohol. Example 3 was initiated with the initiator of the present invention, the preformed adduct of (DMa)BMA/n-butyl lithium, and was quenched with isopropyl alcohol. Example 4 was initiated with n-butyl lithium and quenched with isopropyl alcohol. Thus, Example 4 was a control, characterizing conventional anionic polymerization, and Example 3 demonstrated use of an initiator according to the present invention. The remaining Examples, 1 and 2 were provided as further comparisons against the present invention. Polymer analyses were conducted by GPC to provide molecular weight values and by NMR to provide amounts of 1,2 and 1,4 content of the diene units, expressed as a percent, as well as the percents of bound styrene and styrene block. Tg was determined by DSC.

Examples 5–10 were polymerized at 80° and 50° C. for 1.6 and 6 hours, respectively, as reported in Tables III and IV. Examples 4,5 and 10 are controls, initiated with n-butyl lithium and quenched with isopropyl alcohol. Examples 6–9 were initiated with the preformed catalyst of the present invention, which had been aged 4 days at 25° C., and were quenched with isopropyl alcohol or (DMa)BMA, as noted in the Tables. Polymer analyses were again conducted and have been reported at the bottom of Tables III and IV.

TABLE I

Preparation of SBR Copolymers Using Schiff Base Initiators

|  | Polymer 1 | Polymer 2 |
|---|---|---|
| BD/Sty/hexane (g) | 203.2 | 208.0 |
| Bd/Sty (g) | 52.2 | 53.5 |
| Initiator | n-BuLi[a] | BMA/n-BuLi |
| Initiator (mmoles) | 0.37 | 0.38 |
| Modifier[b] | 0.10 | 0.10 |
| Hours at 50° C. | 5.5 | 5.5 |
| Quench | (DMa)BMA | i-PrOH[c] |
| (mmoles) | 0.4 |  |
| Mn | 157,293 | 220,933 |
| Mw | 184,327 | 351,988 |
| Mw/Mn | 1.17 | 1.59 |
| Tg, °C. | −44.9 | −27.7 |
| % 1,2 | 38.4 | 51.1 |
| % 1,4 | 37.4 | 24.6 |
| % bound Sty | 24.2 | 24.3 |
| % block Sty | 0 | 0 |

[a] n-butyl lithium
[b] mmoles of hetero atom
[c] isopropyl alcohol

TABLE II

Preparation of SBR Copolymers Using Schiff Base Initiators

|  | Polymer 3 | Polymer 4 |
|---|---|---|
| BD/Sty/hexane (g) | 203.2 | 203.7 |
| Bd/Sty (g) | 52.2 | 52.4 |
| Initiator | (DMa)BMA/n-BuLi[a] | n-BuLi |
| Initiator (mmoles) | 0.55 | 0.37 |
| Modifier[b] | 0.10 | 0.10 |
| Hours at 50° C. | 6.2 | 6.2 |
| Quench | i-PrOH[c] | i-PrOH |
| Mn | 166,150 | 152,786 |
| Mw | 231,798 | 175,883 |
| Mw/Mn | 1.40 | 1.15 |
| Tg, °C. | −33.4 | −45.1 |
| % 1,2 | 45.5 | 34.7 |
| % 1,4 | 30.0 | 41.1 |
| % bound Sty | 24.5 |  |
| % block Sty | 0 |  |

[a] n-butyl lithium
[b] mmoles of hetero atom
[c] isopropyl alcohol

TABLE III

Preparation of SBR Copolymers Using Schiff Base Initiators

|  | Polymer 5 | Polymer 6 | Polymer 7 |
|---|---|---|---|
| BD/Sty/hexane (g) | 205.3 | 213.9 | 215.9 |
| Bd/Sty (g) | 52.8 | 54.9 | 55.5 |

TABLE III-continued

Preparation of SBR Copolymers Using Schiff Base Initiators

| | Polymer 5 | Polymer 6 | Polymer 7 |
|---|---|---|---|
| Initiator | n-BuLi[a] | (DMa)BMA/n-BuLi | (DMa)BMA/n-BuLi |
| Initiator (mmoles) | 0.37 | 0.58 | 0.58 |
| Modifier[b] | 0.33 | 0.34 | 0.34 |
| Hours at 80° C. | 1.6 | 1.6 | 1.6 |
| Quench | i-PrOH[c] | i-PrOH | (DMa)BMA |
| (mmoles) | | | 0.73 |
| Mn | 152,978 | 134,596 | 134,854 |
| Mw | 195,963 | 219,634 | 222,496 |
| Mw/Mn | 1.28 | 1.63 | 1.65 |
| Tg, °C. | −54.3 | −50.1 | −49.2 |
| % 1,2 | 33.0 | 34.9 | 35.0 |
| % 1,4 | 42.2 | 41.2 | 41.1 |
| % bound Sty | 24.7 | 23.9 | 23.9 |
| % block Sty | 3.5 | 1 | 0 |

[a] n-butyl lithium
[b] mmoles of hetero atom
[c] isopropyl alcohol

TABLE IV

Preparation of SBR Copolymers Using Schiff Base Initiators

| | Polymer 8 | Polymer 9 | Polymer 10 |
|---|---|---|---|
| BD/Sty/hexane (g) | 204.4 | 211.5 | 186.9 |
| Bd/Sty (g) | 52.5 | 54.4 | 48.0 |
| Initiator | (DMa)BMA/n-BuLi | (DMa)BMA/n-BuLi | n-BuLi[a] |
| Initiator (mmoles) | 0.46 | 0.48 | 0.34 |
| Modifier[b] | 0.10 | 0.10 | 0.10 |
| Hours at 50° C. | 6 | 6 | 6 |
| Quench | i-PrOH[c] | (DMa)BMA | i-PrOH |
| (mmoles) | | 0.60 | |
| Mn | 185,482 | 191,192 | 161,682 |
| Mw | 252,234 | 251,046 | 193,185 |
| Mw/Mn | 1.36 | 1.31 | 1.19 |
| Tg, °C. | −32.7 | −34.3 | −44.5 |
| % 1,2 | 47.2 | 44.7 | 36.7 |
| % 1,4 | 27.6 | 30.6 | 39.0 |
| % bound Sty | 25.2 | 24.8 | 24.3 |
| % block Sty | 0 | 0 | 0 |

[a] n-butyl lithium
[b] mmoles of hetero atom
[c] isopropyl alcohol

Polymers 1-10 were next compounded and cured, following which physical properties were examined. These have been provided in Tables V-VIII and include Tanδ, a measure of hysteresis; stress-strain properties; 300% modulus, tensile strength, and elongation at break; and Mooney viscosity. Tanδ was conducted at 50° C. using a Dynastat, at 1 Hz. It is a measure of the ratio of the loss modulus of the compound to the storage modulus and it has been found that the lower the magnitude of tanδ, the lower is the hysteresis of the compound.

The recipe for the 10 polymer compounds, reported as Examples 11-20, is given below as Stock A which is a conventional rubber formulation for tires. Polymer added was 100 parts by weight for each example which employed one of the polymers reported as Polymers 1-10. Remaining components were employed on a parts per 100 parts of rubber basis, or phr. The rubber compounds were vulcanized for 35 minutes at 148° C.

| STOCK A | |
|---|---|
| Polymer (1-10) | 100 |
| Naphthenic oil | 10 |
| Carbon black | 55 |
| Zinc oxide | 3 |
| Antioxidant | 1 |
| Wax | 2 |
| Stearic acid | 2 |
| Sulfur | 1.5 |
| Accelerator | 1 |
| | 175.5 |

TABLE V

Hysteresis Properties of Rubber Compounds Containing Polymers 1-10

| Example No. | Polymer (Ex. No.) | Tanδ | % ΔTanδ |
|---|---|---|---|
| 11 | 1 | 0.1110 | −18.5 |
| 12 | 2 | 0.1244 | −8.7 |
| 13 | 3 | 0.0974 | −28.5 |
| 14 | 4 | 0.1362 | — |
| 15 | 5 | 0.1150 | — |
| 16 | 6 | 0.0979 | −14.9 |
| 17 | 7 | 0.1045 | −9.1 |
| 18 | 8 | 0.0934 | −18.9 |
| 19 | 9 | 0.0801 | −30.5 |
| 20 | 10 | 0.1152 | — |

TABLE VI

Stress Strain Properties of Rubber Compounds Containing Polymers 1-10

| Example No. | Polymer-Ex. No. | 300% modulus psi | Tensile psi | % Elongation at break |
|---|---|---|---|---|
| 11 | 1 | 2257 | 2912 | 368 |
| 12 | 2 | 2097 | 2795 | 370 |
| 13 | 3 | 2246 | 2869 | 361 |
| 14 | 4 | 2033 | 2810 | 392 |
| 15 | 5 | 1628 | 2062 | 357 |
| 16 | 6 | 2035 | 3035 | 409 |
| 17 | 7 | 1748 | 2729 | 425 |
| 18 | 8 | 2052 | 2643 | 364 |
| 19 | 9 | 2142 | 2913 | 372 |
| 20 | 10 | 1721 | 2421 | 393 |

TABLE VII

Mooney Viscosity of Rubber Compounds Containing Polymers 1-10

| Polymer No. | Example No. | ML$_4$ @ 100° C. |
|---|---|---|
| 1 | 11 | 102 |
| 2 | 12 | 105 |
| 3 | 13 | 131 |
| 4 | 14 | 85 |
| 5 | 15 | 89.3 |
| 6 | 16 | 106 |
| 7 | 17 | 107.3 |
| 8 | 18 | 136.5 |
| 9 | 19 | 126.3 |
| 10 | 20 | 87.0 |

With respect first to the data provided in Table V, and Examples 11-14, the tan δ for Example 14, containing Polymer 4 the control was 0.1362. Inasmuch as a lower value indicates improved hysteresis, it can readily be noted that Example 13, containing Polymer 3, prepared with an initiator of the present invention, showed a most favorable improvement in hysteresis. The remaining polymers, 1 and 2 provided other values. Example 11, containing polymer 1, a medium vinyl styrene/butadiene rubber (SBR) which was quenched by reaction with dimethylaminobenzylidenemethylamine, (DMa)BMA, showed a reduction in hysteresis compared to the control of Example No. 14. This shows that the Schiff base has effectiveness in reducing hysteresis when incorporated at the end of the chain as is disclosed in our copending application now U.S. Pat. No. 5,066,729. The terminators disclosed therein can be utilized for this purpose and are incorporated herein by reference. The extent of hysteresis reduction was not as great as that of Example No. 13, because some "living" C-Li chain ends were lost during the course of the polymerization due to side reactions. As a result, not all chains in Polymer 1 were carrying the Schiff base.

Example No. 12 contained Polymer 2, which was prepared according to the present invention, except that the Schiff base used did not contain a tertiary amino substituent on the phenyl ring. A small reduction in tan $\delta$ was noted in comparison to Example No. 14. However, the reduction was largely due to the fact that the molecular weight of Polymer 2 was significantly higher than that of Polymer 4. Comparing Examples 15–20, improved hysteresis was again demonstrated for compounds containing polymers initiated according to the present invention.

In Tables VI and VII, it can be seen that 300% modulus and tensile properties were improved or at least as good for compounds containing polymers initiated according to the present invention compared to the use of the conventional n-butyl lithium initiator. Mooney viscosities were raised in compounds containing polymers initiated according to the present invention. Also, the effect of providing a terminal Schiff base can be studied.

Measurements of tan $\delta$ under identical conditions in a series of compounds, 21–23, containing unmodified medium vinyl styrene/butadiene rubber (MVSBR) polymers having closely matched structures, but increasing molecular weights showed an inverse relationship between molecular weight (Mw) and tan $\delta$, as reported in table VIII.

TABLE VIII

Hysteresis as Function of Molecular Weight in Unmodified MVSBR

| Polymer No. (MVSBR, Unmodified) | Mn | Mw | Tan$\delta$, 50° C. |
|---|---|---|---|
| 21 | 69,017 | 74,248 | 0.2807 |
| 22 | 108,535 | 124,437 | 0.2016 |
| 23 | 187,791 | 243,148 | 0.1225 |

It has been found that the reduction in hysteresis as achieved according to the present invention exceeded the results expected on the basis of molecular weight effects. An unexpected advantage of the present invention is the reduction in hysteresis for compositions containing a functionalized polymer as described herein which, in turn, will allow the utilization of lower molecular weight elastomers which are more readily processable.

As noted hereinabove, the polymers of the present invention can also be terminated with a compound that will provide a functional group at the terminal end, such as (DMa)BMA, to form a difunctional polymer, or tin tetrachloride, to couple four monofunctional polymer chains together. In order to demonstrate the preparation of such polymers, that is, their termination with a functional group, six polymers were prepared as Polymer Examples 24–29. Each comprised a medium viscosity SBR rubber (MVSBR) initiated with (DMa)BMA. Example 24, a control was terminated with hydrogen and hence, remained monofunctional, while Examples 25 and 26 were terminated with (DMa)BMA and (DMa)BA, dimethylaminobenzylideneaniline, respectively. Similarly, Example 27 comprised a second control for comparison with Examples 28 and 29 which were terminated with 1,3-dimethyl-2-imidazolidinone (DMI) and tin tetrachloride, respectively. Rubber compounds 30–32 were each prepared in a manner similar to Examples 11–20, utilizing Stock A and containing Polymer Examples 24–26. Each compound was prepared with 55 phr of carbon black. Polymer analyses and physical properties for Examples 30–32 have been reported in Table IX. Rubber compounds 33–35 were each prepared in a manner similar to Examples 11–20, utilizing Stock A and containing Polymer Examples 27–29. Each compound was prepared with 55 phr of carbon black. Polymer analyses and physical properties have been reported in Table X.

TABLE IX

MVSBR With Terminal Functional Groups and Physical Properties

| | Polymer Ex. No. | | |
|---|---|---|---|
| | 24 | 25 | 26 |
| Terminator | Isopropanol | (DMa)BMA | (DMa)BA |
| Polymer analyses | | | |
| ML$_4$, 100° C. | 46.0 | 43.0 | 45.5 |
| Mn | 142,855 | 139,925 | 148,934 |
| Mw | 197,641 | 195,628 | 200,882 |
| Mw/Mn | 1.38 | 1.40 | 1.35 |
| Tg, °C. | −45.0 | — | — |
| % 1,2 | 40.7 | — | — |
| % 1,4 | 38.3 | — | — |
| % Bound Sty | 20.9 | — | — |
| % Block Sty | 0 | — | — |

| | Compound Ex. No. | | |
|---|---|---|---|
| | 30 | 31 | 32 |
| Compounding Results | | | |
| Tan$\delta$ | 0.1006 | 0.0945 | 0.0865 |
| Tensile strength (psi) | 2825 | 2670 | 2664 |
| % Elongation at Break | 355 | 325 | 330 |
| Compound ML$_4$ at 100° C. | 120.2 | 134.8 | 155.7 |

TABLE X

MVSBR With Terminal Functional Groups and Physical Properties

| | Polymer Ex. No. | | |
|---|---|---|---|
| | 27 | 28 | 29 |
| Terminator | Isopropanol | DMI (1,3-Dimethyl-2-imidazolidinone) | SnCl$_4$ |
| Polymer analyses | | | |
| ML$_4$, 100° C. | 43.0 | 45.5 | 141 |
| Mn | 136,473 | 127,649 | 132,169 |
| Mw | 195,709 | 190,658 | 261,818 |
| Mw/Mn | 1.43 | 1.49 | 1.98 |
| Tg, °C. | −32.2 | — | — |
| % 1,2 | 42.8 | — | — |

TABLE X-continued

MVSBR With Terminal Functional Groups and Physical Properties

| % 1,4 | 30.2 | — | — |
|---|---|---|---|
| % Bound Sty | 27.0 | — | — |
| % Block Sty | 0 | — | — |

| | Compound Ex. No. | | |
|---|---|---|---|
| | 33 | 34 | 35 |
| | Compounding Results | | |
| Tanδ | 0.1102 | 0.1031 | 0.1077 |
| Tensile strength (psi) | 2858 | 2670 | 2998 |
| % Elongation at Break | 397 | 320 | 353 |
| Compound ML₄ at 100° C. | 95.0 | 109.0 | 110.4 |

As is apparent from the data in Tables IX and X, the rubber compounds with a terminal functional group exhibited a further reduction in tan δ when compounded with carbon black and vulcanized than the controls, Examples 30 and 33, which contained a functional group only at the initiator end (Polymer Examples 24 and 27).

In conclusion, it should be clear from the foregoing examples and specification disclosure that the initiators of the present invention are useful for the anionic polymerization of diene monomers to form homopolymers as well as copolymers with monovinyl aromatic polymers or trienes. The resulting elastomeric polymers have a functional group at the site of initiation and a lithium atom at the terminal, "living" end. After quenching, the polymers still retain the functional group at the site of initiation, which promotes uniform and homogeneous mixing with carbon black. As a result vulcanizable elastomeric compounds containing these polymers exhibit improved hysteresis which provides lower rolling resistance in tires and improved fuel economy. Additionally, the lithium terminated polymers can be quenched with compounds to provide terminal functional groups and hence, difunctional polymer chains.

It is to be understood that the invention is not limited to the specific Schiff bases, i.e., substituted aldimines, substitutes ketimines, substituted secondary amines and organolithium compounds disclosed nor to any particular modifier or solvent. Similarly, the examples have been provided merely to demonstrate practice of the subject invention and do not constitute limitations of the invention. Those skilled in the art may readily select other monomers and process conditions, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. An anionic polymerization initiator comprising the reaction product of:
   a functionalizing agent selected from the group consisting of substituted aldimines having the general formula

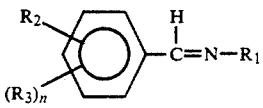

where $R_1$ is selected from the group consisting of alkyls and aralkyls having from 1 to about 20 carbon atoms, with the proviso that the carbon atom adjacent the nitrogen atom contains at least one hydrogen; $R_2$ is selected from the group consisting of dialkyl and dicycloalkyl aminos having the formula

and cyclic amines having the formula

where $R_4$ is selected from the group consisting of alkyls, cycloalkyls or aralkyls having from 1 to about 12 carbon atoms, wherein both $R_4$'s may be the same or different groups; $R_5$ contains from 3 to about 6 methylene groups; $R_3$ is an alkyl group having from 1 to about 12 carbon atoms and n is an integer from 0 to 4;

substituted ketimines having the general formula

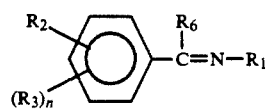

where $R_1$, $R_2$, $R_3$ and n are as described hereinabove and $R_6$ is selected from the group consisting of alkyls, aryls, cycloalkyls, alkenyls and aralkyls having from 1 to about 20 carbon atoms and short chain length low molecular weight polymers from diolefin and vinyl aryl monomers having to up about 25 units; and substituted secondary amines having the general formula

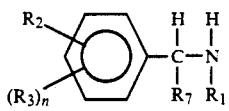

where $R_1$, $R_2$, $R_3$ and n are as described hereinabove and $R_7$ is H or R; and an organolithium compound having the general formula RLi wherein both of the foregoing R groups are selected from the group consisting of alkyls, cycloalkyls, alkenyls, alkynyls, aryls and aralkyls having from 1 to about 20 carbon atoms and short chain length low molecular weight polymers from diolefin and vinyl aryl monomers having up to about 25 units.

2. An anionic polymerization initiator, as set forth in claim 1, wherein said organolithium compound is n-butyl lithium and said substituted aldimine is dimethylaminobenzylidenemethylamine.

3. A method of preparing an anionic polymerization initiator comprising the steps of:

reacting a functionalizing agent selected from the group consisting of substituted aldimines having the general formula

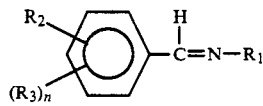

where $R_1$ is selected from the group consisting of alkyls and aralkyls having from 1 to about 20 carbon atoms, with the proviso that the carbon atom adjacent the nitrogen atom contains at least one hydrogen; $R_2$ is selected from the group consisting of dialkyl and dicycloalkyl aminos having the formula

and cyclic amines having the formula

where $R_4$ is selected from the group consisting of alkyls, cycloalkyls or aralkyls having from 1 to about 12 carbon atoms, wherein both $R_4$'s may be the same or different groups; $R_5$ contains from 3 to about 6 methylene groups; $R_3$ is an alkyl group having from 1 to about 12 carbon atoms and n is an integer from 0 to 4;

substituted ketimines having the general formula

where $R_1$, $R_2$, $R_3$ and n are as described hereinabove and $R_6$ is selected from the group consisting of alkyls, aryls, cycloalkyls, alkenyls and aralkyls having from 1 to about 20 carbon atoms and short chain length low molecular weight polymers from diolefin and vinyl aryl monomers having to up about 25 units; and substituted secondary amines having the general formula

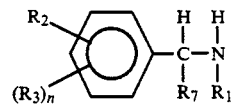

where $R_1$, $R_2$, $R_3$ and n are as described hereinabove and $R_7$ is H or R; and an organolithium compound having the general formula RLi wherein both of the foregoing R groups are selected from the group consisting of alkyls, cycloalkyls, alkenyls, alkynyls, aryls and aralkyls having from 1 to about 20 carbon atoms and short chain length low molecular weight polymers from diolefin and vinyl aryl monomers having up to about 25 units.

4. A method of preparing an anionic polymerization initiator, as set forth in claim 3, wherein said organolithium compound is n-butyl lithium and said substituted aldimine is dimethylaminobenzylidenemethylamine.

5. A method of preparing an anionic polymerization initiator, as set forth in claim 3, wherein said step of reacting includes the step of forming a solution comprising from about 0.8 to 1.2 mmoles of said functionalizing agent per 1 mmole of said organolithium compound in an anhydrous aprotic solvent.

* * * * *